US012383776B2

(12) United States Patent
de Souza Junior

(10) Patent No.: US 12,383,776 B2
(45) Date of Patent: Aug. 12, 2025

(54) METHOD AND SYSTEM FOR PRODUCING CARBON DIOXIDE JETS AND EJECTOR MEANS CONFIGURED TO EXPEL HIGH-SPEED CARBON DIOXIDE JETS WITH SOLID PHASE SUBLIMATION

(71) Applicant: Jetfreezr Tecnologia Limitada, Rio de Janeiro (BR)

(72) Inventor: Moacyr Duarte de Souza Junior, Niteroi (BR)

(73) Assignee: Jetfreezr Tecnologia Limitada, Rio de Janeiro (BR)

( * ) Notice: Subject to any disclaimer, the term of this patent is extended or adjusted under 35 U.S.C. 154(b) by 448 days.

(21) Appl. No.: 17/774,725

(22) PCT Filed: Sep. 14, 2020

(86) PCT No.: PCT/BR2020/050364
§ 371 (c)(1),
(2) Date: May 5, 2022

(87) PCT Pub. No.: WO2021/253101
PCT Pub. Date: Dec. 23, 2021

(65) Prior Publication Data
US 2022/0370843 A1 Nov. 24, 2022

(30) Foreign Application Priority Data
Jun. 16, 2020 (BR) .................... BR 1020200121545

(51) Int. Cl.
*A62C 5/00* (2006.01)

(52) U.S. Cl.
CPC .................................... *A62C 5/004* (2013.01)

(58) Field of Classification Search
CPC ...................................................... A62C 5/004
(Continued)

(56) References Cited

U.S. PATENT DOCUMENTS 1,644,338 A 10/1927 Jones
2,730,178 A 1/1956 Risinger
(Continued)

FOREIGN PATENT DOCUMENTS

BR PI0802403-0 A2 5/2011
CN 202724514 U 2/2013
(Continued)

OTHER PUBLICATIONS

International Search Report (with English translation) mailed Mar. 11, 2021 for International application No. PCT/BR2020/050364.
(Continued)

*Primary Examiner* — Christopher S Kim
(74) *Attorney, Agent, or Firm* — Lippes Mathias LLP

(57) ABSTRACT

The present invention refers to a method and system for ejecting carbon dioxide as High-Speed Jets with Sublimation. More specifically, the present invention describes a method and system capable of controlling and extinguishing fires from the $CO_2$ ejected. In summary, the proposed method comprises the steps of removing $CO_2$ in a first state (G) from the storage medium (2) and inserting the $CO_2$ in first state (G) in the driver set (3); maintaining the insertion of $CO_2$ in first state in the driver set (3) up to the equalization of the internal pressure between the storage medium (2) and the driver set (3); removing carbon dioxide in a second state (L) from the storage medium (2) and inserting the carbon dioxide in second state in the driver set (3) after the equalization of the pressure of the storage medium (2) and of the driver set; ejecting the $CO_2$ in the form of high-speed jets with high content of $CO_2$ in third state (S) through the driver set (3).

8 Claims, 10 Drawing Sheets

(58) Field of Classification Search
USPC ..................... 169/44, 46, 47; 239/418–427.5
See application file for complete search history.

(56) References Cited

U.S. PATENT DOCUMENTS

| | | | |
|---|---|---|---|
| 5,853,128 A | | 12/1998 | Bowen et al. |
| 7,451,941 B2 | * | 11/2008 | Jackson ................ B08B 7/0092 239/419 |
| 2013/0248210 A1 | | 9/2013 | Moacyr Duarte De Souza |

FOREIGN PATENT DOCUMENTS

| | | | |
|---|---|---|---|
| CN | 204395276 | U | 6/2015 |
| CN | 106640177 | A | 5/2017 |
| CN | 108325124 | A | 7/2018 |
| CN | 209019827 | U | 6/2019 |
| CN | 210145346 | U | 3/2020 |
| CN | 210743824 | U | 6/2020 |
| GB | 470193 | | 8/1937 |
| GB | 556978 | | 10/1943 |
| GB | 2438587 | A | 5/2007 |
| RU | 2429036 | C1 | 9/2011 |
| WO | 9419059 | A1 | 9/1994 |
| WO | 9952599 | A1 | 10/1999 |
| WO | 2005079923 | A1 | 9/2005 |

OTHER PUBLICATIONS

Written Opinion mailed Mar. 11, 2021 for International application No. PCT/BR2020/050364.

* cited by examiner

METHOD AND SYSTEM FOR PRODUCING CARBON DIOXIDE JETS AND EJECTOR MEANS CONFIGURED TO EXPEL HIGH-SPEED CARBON DIOXIDE JETS WITH SOLID PHASE SUBLIMATION

The present invention refers to a method and system for producing carbon dioxide jets with great expansion and high sublimated solid phase percentage. More specifically, the present invention describes a method and system capable of controlling and extinguishing fires with the above referred carbon dioxide jet. There is further described an ejector means configured to expel carbon dioxide jets as well as the use of a fluid with biphasic mixture of $CO_2$ in firefighting.

STATE OF THE ART DESCRIPTION

Fires in residential and commercial buildings throughout the world have caused many deaths, injuries, and enormous material losses. Particularly in the case of urban buildings, the fires became extremely difficult to control due to the complex layouts of the modern constructions.

The main common point of all the complex layouts are the buildings with floors with offices and shops, which consist in a large area with just one access point. Contrary to the traditional commercial buildings, in the new layouts, the regular floor has several workstations separated by half-walls or even without separations. In the same manner, in the shopping centers the shops are open to the corridors and the food plazas present this same characteristic. In these layouts, the only access point is the elevator and the stairs that are available on the floor. In an external approach, the firefighters must face powerful flames and are restricted to few access points, according to the availability of operation points for mechanical ladders.

Considering this layout, in a fire, the firefighters do not have ways to penetrate in the compartment with the currently available means. The use of high-pressure water hoses does not affect the burned cell. Regardless of how many hoses are available, there will not be space to position them and surround the fire and consequently cool the compartment.

Another problem is the limitation of the use of water as a fire extinguishing agent. The boiling point of water is of (212° F.) or 100° C. (at atmospheric pressure) and the regular temperatures of an internal Class “A” fire can reach (1300° F.) or 700° C. even 900° C. Therefore, all the water vaporizes in the peripheral limits of the flame and does not penetrate the combustion cell. These confined high-temperature cores are the main condition to begin the phenomenon known as flashover.

Even when the firefighters can penetrate in the compartments and extinguish the fire, the use of regular high-pressure hoses causes great damages in the burned area, apart from the destruction caused by fire. In this sense, there are many complaints about damages to property caused by high-pressure water jets used by the firefighters, for example, when the fire occurs in museums, churches, or any other historic heritage. In the same manner, this occurs with the assets of common citizens whether they are material or affective.

To control and extinguish large class “A” fires, there are standard sets of equipment used by firefighters in nearly all countries. The available means can be classified in two groups: water-based systems and systems based on inert gas.

The present invention aims at overcoming the problems found in the state of the art by means of a method and system which can produce high-pressure jets with high solid phase carbon dioxide content, more specifically, a method and system are approached which are capable of controlling and extinguishing fires using massive discharge of carbon dioxide jet.

In summary, the disclosures in the present invention consist in pumping a continuous flow of jets of $CO_2$ with high-speed, in the range between 10 m/s and 100 m/s, in the form of small carbonic snowflakes, by means of a driver set, such as a hose and an ejector nozzle.

More specifically, the present invention proposes that the carbon dioxide, at a prior moment to being expelled, be present in the biphasic system in gaseous state and in liquid state and, subsequently, when expelled, the carbon dioxide will be present in a biphasic system in solid state and in gaseous state, it being thus understood that the liquid state, when it is ejected, will be solidified. Subsequently, and already in contact with the burned area, there will occur the sublimation of the carbon dioxide (solid state reaches a gaseous state), thus favoring the fire fighting.

In synthesis, the teachings of the present invention present at least the following advantages:

The jets expelled can unbalance the air intakes of the fire along a line, immediately reducing the burn rate. The jet expelled can create a corridor to penetrate in large compartments with a layout of only one access point. The directed carbon dioxide can expel smoke and hot or inflammable gas pockets, allowing the firefighters to penetrate very rapidly in the compartments of the burned area.

Moreover, the temperature of the dry ice at 1 atm is of (−109.3° F.) −78° C. The sublimation of dry ice requires (245.5 BTU/lb) 571.3 kJ/kg, causing cooling of the compartment and, as a natural physical consequence, immediately reducing the volatile emissions of solid combustible materials. To achieve this objective, the dry ice content in the jet flow must be of at least 50%.

The continuous injection will result in a progressive reduction of the oxygen concentration inside the compartment and in the extinction of all the fire, even under a pile of debris.

It is emphasized that the kinetic energy of the expelled jet is an essential question for reaching the objectives proposed in the present invention. The sublimation phenomenon occurs in tenths of seconds and without the high-speed movement induced by pressure, the carbonic snowflakes (carbon dioxide in solid phase) would not be distributed in the jet. Therefore, the long line of $CO_2$ which unbalances the air intakes of the fire, as previously described, would not occur. It is important to emphasize that the intensive formation of the solid phase is due to the sudden decompression which occurs after the ejection.

Complementarily, without the high-speed movement to spread the dry ice flow by sublimation, the cooling effect would be restricted to the surroundings of the ejection point, said fact would be useless in most fires.

The expelled jet may have a surrounding range of (40 feet) 12 meters and, if directed to the roof of the compartments, can totally prevent the occurrence of phenomena known as flashover.

Another critical situation in firefighting consists in tackling confined flames. In these cases, there are excessive inflammable gases and lack of oxygen which prevent the total combustion reaction. Opening a door or window to enter a compartment will cause the effect known as backdraft, meaning in this manner an expansion of unburned gases in a progressive mixture with the air available in the surrounding compartments or in the outdoor spaces.

In view of these situations, the use of massive discharges of jets according to the teachings of the present invention in the surrounding compartments prior to opening any door/window, can totally prevent the occurrence of the backdraft. Subsequently, the rapid cooling effect will condense most of the unburned combustible gases in the compartment.

OBJECTIVE OF THE INVENTION

The present invention has as objective the provision of a method and a system capable of producing and expelling (ejecting) carbon dioxide jets, more specifically, to a method and system capable of controlling and extinguishing fires as from the expelled carbon dioxide.

An additional object of the present invention consists in a method and system capable of expelling (ejecting) carbon dioxide in a first state G and in a third state S.

The present invention further proposes an ejector means configured to expel carbon dioxide jets.

The present invention further proposes the use of a fluid with a biphasic mixture of $CO_2$ in firefighting, wherein the fluid comprises $CO_2$ in a first state G and in a third state S, so the fluid comprises at least 50% of $CO_2$ in the third state S.

BRIEF DESCRIPTION OF THE INVENTION

The present invention describes a method for producing carbon dioxide jets as from the association of a storage medium for carbon dioxide with a driver set, wherein the method comprises the steps of: removing carbon dioxide in a first state from the liquid/gas biphasic system contained inside the storage medium and inserting the carbon dioxide in a first state in the driver set, wherein the method further comprises the step of retaining at least one portion of the carbon dioxide in first state in the driver set and removing carbon dioxide in a second state L from the storage medium and inserting the carbon dioxide in second state L in the driver set, wherein the method further comprises the step of ejecting a carbon dioxide jet by means of the driver set.

The invention further describes a system for expelling carbon dioxide jets, the system comprising a storage medium for carbon dioxide associated to a driver set, wherein the storage medium is maintained at a first pressure, so the system is configured to further comprise: a pressure controller associated to storage medium, wherein the pressure controller is configured to remove carbon dioxide in a first state from the storage medium and insert the carbon dioxide in first state in the driver set, wherein the system is further configured to equal a pressure value of the driver set to the value of the first pressure.

There is further described an ejector means configured to expel carbon dioxide jets, the ejector means being able to associate with a storage medium, wherein the storage medium is associated with a first pressure and the ejector means is associated with a second pressure, wherein the ejector means is configured to equal the value of the first pressure with the value of the second pressure by means of the reducing portion in the ejector means.

BRIEF DESCRIPTION OF THE DRAWINGS

The present invention will now be described in greater detail, based on a sample of execution represented in the drawings. The figures show.

DETAILED DESCRIPTION OF THE FIGURES

The present invention describes a method and system for producing carbon dioxide jets, wherein these are also referenced solely as method and system. More specifically, the teachings proposed herein can be applied in the control and extinction of fires as from the ejected carbon dioxide jets. In one embodiment, the present invention can be used in fighting fires of the "A", "B" and "C", types, anyway, said characteristic must not be considered as a limitation of the present invention, thus it is understood that the teachings proposed herein could be used to combat any types of fires, where there does not exist chemical incompatibility between the fire load and the extinction agent used in the system.

Figure 1:
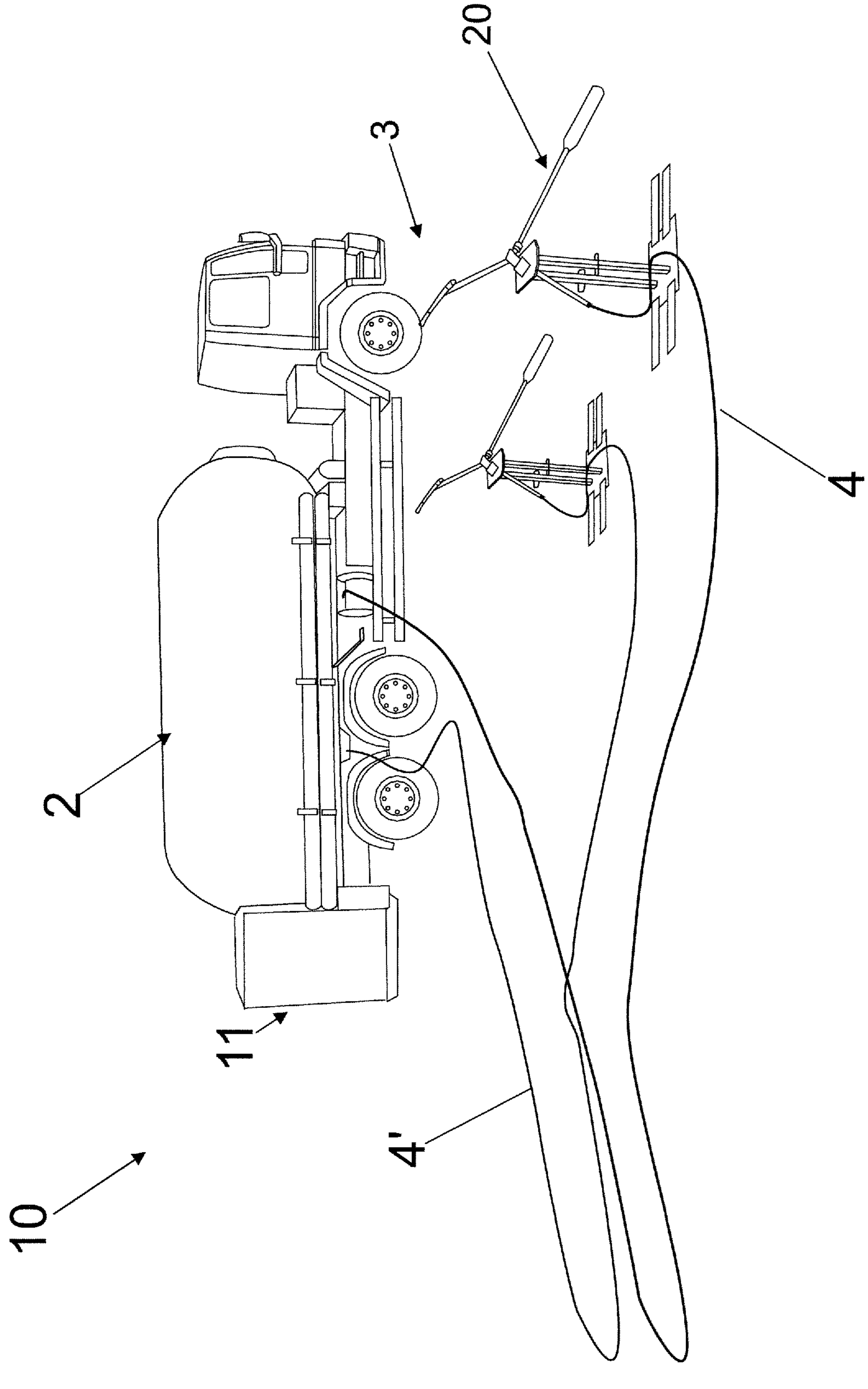
FIG. 1—is a representation of an embodiment of the system for producing carbon dioxide jets as proposed in the present invention.

In summary, and referring to FIG. 1, the teachings of the present invention consider the existence of storage medium for carbon dioxide 2 (also referenced solely as storage medium 2) associated to a driver set 3.

The storage medium 2 must be understood as being any element, equipment, portion or part which is capable of storing carbon dioxide with the characteristics of the liquid/gas biphasic system, in the interior thereof. In the illustration of FIG. 1, the storage medium 2 is shown as a storage tank 2 arranged in a motor vehicle, anyway, it is emphasized that the representation of the storage medium 2 as a tank must not be considered as a limitative characteristic of the present invention, so that any component that can store carbon dioxide can be understood as a storage medium 2.

Additionally, the representation carried out in FIG. 1 that the storage means 2 is associated to a motor vehicle must not be considered either as being a limitative characteristic of the present invention, whereby in fully valid embodiments the storage medium could be fixedly arranged in a certain location. More specifically, it must be understood that the positioning of the storage medium 2 must not be considered as being an essential characteristic of the present invention.

Therefore, it is emphasized that the storage medium 2 can be understood as being a fixed or movable storage medium.

Still in connection with the storage medium 2, some non-limitative characteristics relative to said component are cited next: (i) storage and transport conditions: temperature between −4° F. to 0° F. (−20° C. to −18° C.) and pressure at 350 psig (24.1 kgf/cm$^2$), (ii) the adequate container for storing the carbon dioxide load in biphasic system, that is, liquid phase and gaseous phase, as presented in the diagram of phases of the $CO_2$ (FIG. 8), the predominant quantity being in liquid phase, must have double shield, with an internal shielding (cryogenic tank) and external (cryogenic tank protection), (iii) the pressure vessel, as defined in NR-13, (pressure vessel) must be manufactured in carbon steel ASTM-A-612 and the project, construction and testing thereof must be in accordance with Section VIII Div. I of ASME, (iv) the pressure vessel (pressure vessel) must be thermally insulated with an expanded polyurethane layer, pearlite under vacuum layer and coated with fiberglass and resin, or any other insulating thermal material that comes to be developed or adapted to the proposed purpose (v) loading and unloading operations must be carried out by a transfer element for $CO_2$ which can be reversibly operated, that is, for loading and unloading operations, with a flow in the range of 50 to 400 GPM (Gallons per minute) (190 to 1514 LPM (Liters per minute)) and transfer pressure around 400 psig or 28 kgf/cm$^2$ (maximum pressure at 500 psig (35 kgf/cm$^2$) that is, between 17 bar and 20 bar (17 kgf/cm$^2$ and 20 kgf/cm$^2$), (vi) must be coupled to a vaporizer, which is an equipment which removes the $CO_2$ in liquid phase and returns it to the tank in gaseous phase, balancing the internal pressure to prevent the occurrence of solidification of the carbon dioxide in liquid phase, during the unloading in the cited flow, while (vii) the storage medium 2 must allow the storage of the carbon dioxide in gaseous phase and liquid phase (biphasic system as expressed in the diagram of phases of $CO_2$ in FIG. 8).

As regards the last above cited characteristic, it is emphasized that the storage medium 2 must be capable of storing carbon dioxide in a first state G and in a second state L, more specifically, and such as previously mentioned, it is proposed that the storage medium 2 stores carbon dioxide in a biphasic system, that is, gaseous state G and liquid state L in the same pressure vessel.

Still referring to FIG. 1, the system for producing carbon dioxide jets 10 proposed in the present invention further comprises the already referenced driver set 3. In summary, and as will be mentioned ahead, the driver set 3 must comprise at least one transport means 4 associated to the ejector means 20.

Briefly, the ejector means 20 must be understood as a launcher capable of expelling carbon dioxide jets to the environment, further, it is proposed that the ejector means 20 can be handled (controlled) by a responsible professional, such as a firefighter, thus allowing the carbon dioxide to be directed to a region and/or target-point.

As regards the transport means 4, any element that is capable of transporting carbon dioxide from the storage medium 2 to the ejector means 20 could be used. In a non-limitative configuration, the transport means 4 can be configured as a hose, so the use of more than one hose 4 is considered completely acceptable, being observed from FIG. 1 that in this embodiment of the present invention a pair of hoses 4, 4' is used. In summary, the quantity of transport means 4 used must not be considered as being a limitative characteristic of the present invention.

Figure 2:
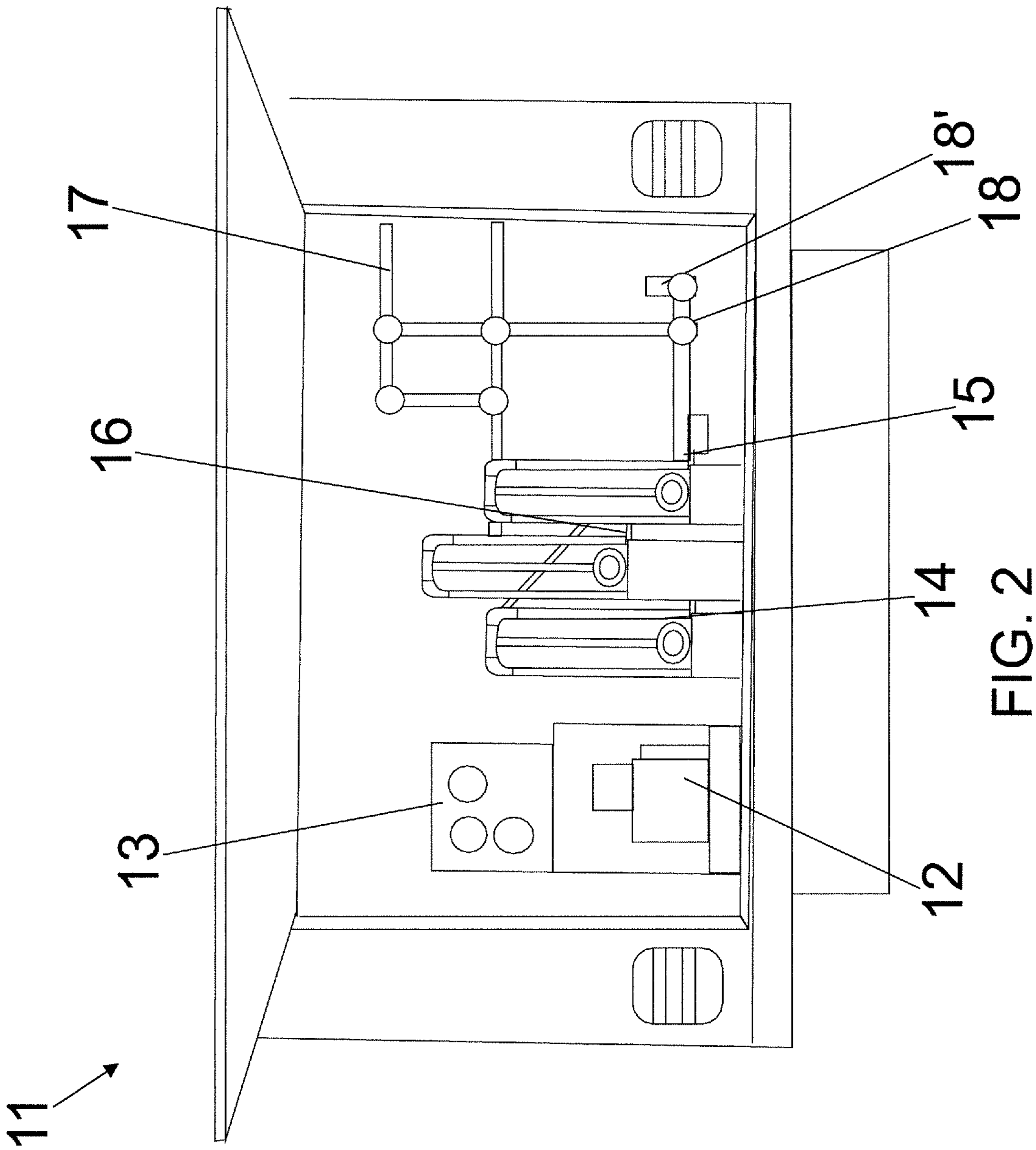
FIG. 2—is a representation of one of the elements that makes up an embodiment of the system for producing carbon dioxide jets as proposed in the present invention.

The system 10 proposed in the present invention further comprises a pressure control means 11 associated to the storage medium 2. FIG. 2 shows the pressure control means 11, wherein in FIG. 2 the pressure control means 11 is arranged in the same motor vehicle which comprises the storage medium 2. In the scenarios where the storage medium 2 is a stationary tank, the pressure control means 11 must be coupled (associated) to the storage medium 2.

It is emphasized that the representation of FIG. 2 must not be considered as being a limitative characteristic of the present invention, being only essential that the pressure control means 11 be associated to the storage medium 2 whether it is movable or stationary.

In summary and having as reference the FIG. 2, the pressure controller in the transfer lines (pressure control means 11) basically comprises the following elements: a transfer element 12, a control panel 13 of the transfer element 12, a loading line for the tank 14 and unloading 15, a gaseous phase equalization line 16, a PSV 17 and two exit lines 18 and 18'.

The transfer element 12 can be understood as being a pump that is capable of removing carbon dioxide from the tank 2 and directing it to the hoses 4, 4' of the driver set 3. It is proposed that the pump 12 is reversible, that is, capable of removing $CO_2$ from the tank, and reintroducing it in the storage medium 2. The alternative to the reversible pump would be the use of two pumps, being one to generate the high-speed jet and the other to carry out the loading of the storage medium 2. This would make the operation more complex without any gain in efficiency. The simplification of the operation constitutes the advantage of the use of the reversible pump, emphasizing that the use of two pumps would not imply in an alteration to the principles of the invention presented herein.

It is thus understood that the use of two pumps would be fully acceptable.

In relation to the dimensioning, the pump 12 (transfer element 12) must be capable of establishing a rate in the range of 50 to 400 GPM (Gallons per minute), or 189 to 1514 LPM (liters per minute) and transfer pressure around 400 psig or 28 kgf/cm$^2$ (maximum pressure at 500 psig or 35 kgf/cm$^2$), not being this a limiting condition, sufficing to adapt the vaporizer to the range used.

In short, and as will be better addressed ahead, the pump 12 is configured to establish in the hoses 4, 4' of the driver set the same pressure conditions that the $CO_2$ has inside the tank.

The control panel 13 allows activating the pump 12 and evaluating the pressure levels of the hoses 4, 4' and of the tank 2. Referring to the loading lines 14 and unloading 15, these have the purpose, respectively, of filling and unloading the storage tank 2 with the load of $CO_2$ in liquid phase, which will be used in the formation of the high-speed jet.

The equalization line of gaseous phase 16 is responsible for removing carbon dioxide in gaseous state from the storage tank 2 and subsequently inserting same in the hoses 4, 4' of the driver set 3.

The PSV 17 (safety valve for controlling the pressure levels) has as function and objective to regulate the internal pressure of the storage medium 2 by means of the ejection of $CO_2$ in gaseous phase to the environment, in case of elevation of temperature and consequently of the pressure in the tank.

The exit lines 18 and 18' are responsible for the injection of $CO_2$ in gaseous phase and subsequently liquid phase in the pressure hoses 4 and 4', which can transfer liquid phase, gaseous phase and biphasic systems, that is, liquid and gas at the same time.

Thus, it is emphasized that in FIGS. 1 and 2 the pressure control means 11 and the storage medium 2 are associated with the motor vehicle, so that said characteristic does not refer to an obligation of the present invention.

In equally valid embodiments, the storage medium 2 could be a stationary medium, in this manner, the use of a coupling device 110 would allow making the system independent from the tank truck, thus associating the coupling device 110 to the stationary storage medium 2. A representation of the coupling device 110 is shown in FIG. 3.

It is thus understood that the coupling device 110 refers to an isolated version of the pressure control means 11 exhibited in FIGS. 1 and 2, this comprising the same function and equipment flow.

Figure 3:
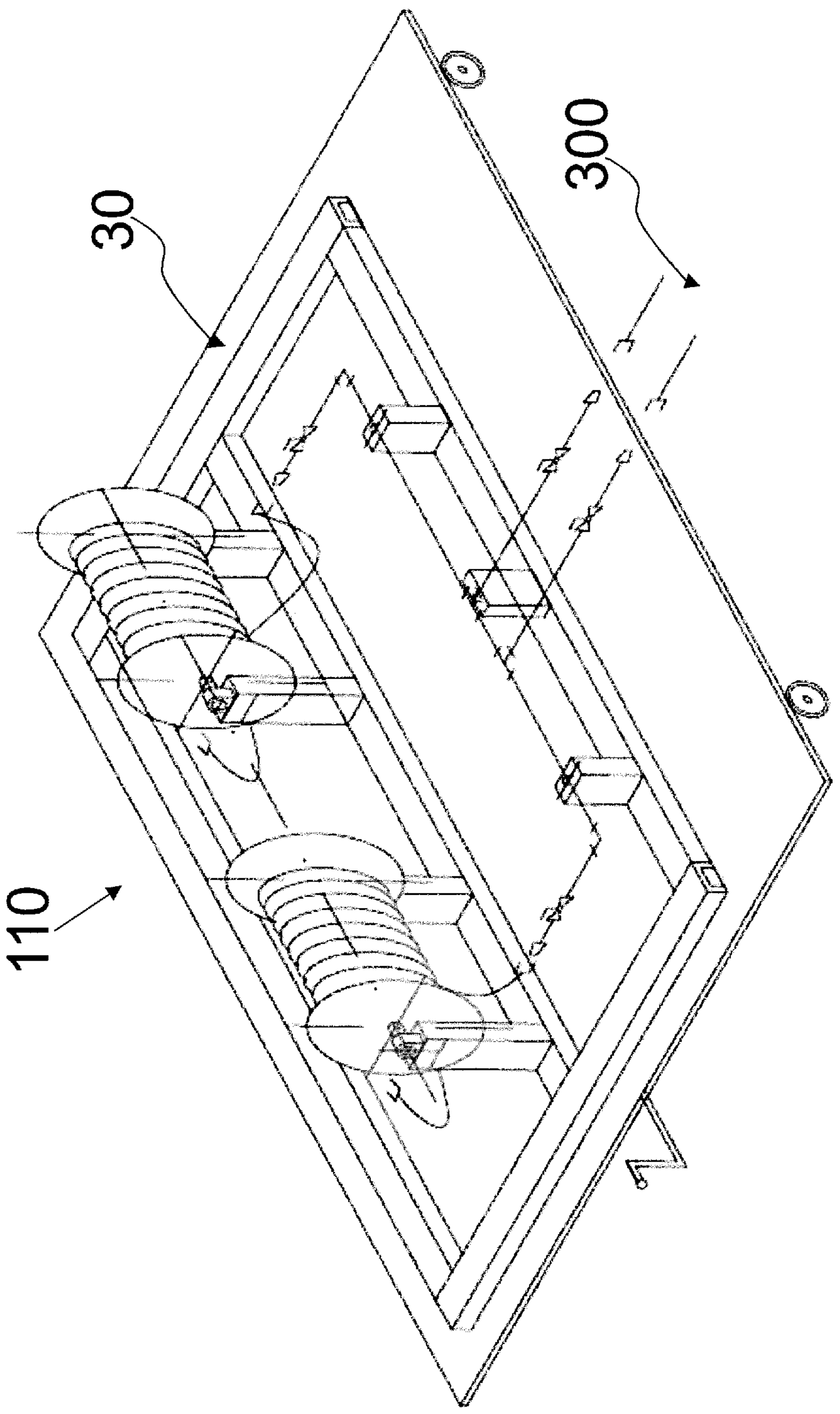
FIG. 3—is an additional representation of one of the elements that can make up the system for producing carbon dioxide jets as proposed in the present invention.

Thus, FIG. 3 shows the coupling device 110 arranged in a movable base 30. The device 110 represented in FIG. 3 must be used in stationary tanks, which can be installed as permanent protection in industrial buildings, commercial, as well as storage sheds for goods and supplies. In FIG. 3, the indication 300 represents the location of association to the stationary storage medium 2.

It is thus understood that the teachings of the present invention can be applied to a movable storage tank (FIG. 2), as well as applied to a stationary storage tank, by means of the use of the coupling device 110 represented in FIG. 3.

As regards the driver set 3, and as previously mentioned, this comprises a transport means 4 (such as a hose) associated to an ejector means 20. With reference to FIG. 1, and in a solely exemplifying manner, this configuration of the invention uses a pair of hoses 4 and 4' wherein each one of them is associated at a connection point with the storage medium 2, such as is observed in FIG. 1.

In summary, each one of the hoses 4 and 4' is capable of transporting carbon dioxide from the storage medium 2 to the driver set 3 and the ejector means 20. More specifically, it is understood that each one of the hoses 4 and 4' can transport carbon dioxide in a first state G and/or a second state L, wherein the first state G consists in carbon dioxide in gaseous state and the second state L consists in carbon dioxide in liquid state. It is thus understood that each one of the hoses 4 and 4' can transport $CO_2$ in gaseous phase or, alternatively, transport $CO_2$ in liquid phase. Additionally, the transport of $CO_2$ in gaseous and liquid state (concomitantly in the same hose) is fully acceptable, within the limits of the phase diagram of carbon dioxide. The flexible hoses are made, in a preferred but not limitative mode, from special elastomers covered in austenitic stainless-steel mesh (304, for example) or ferritic (409, for example).

Figure 4:
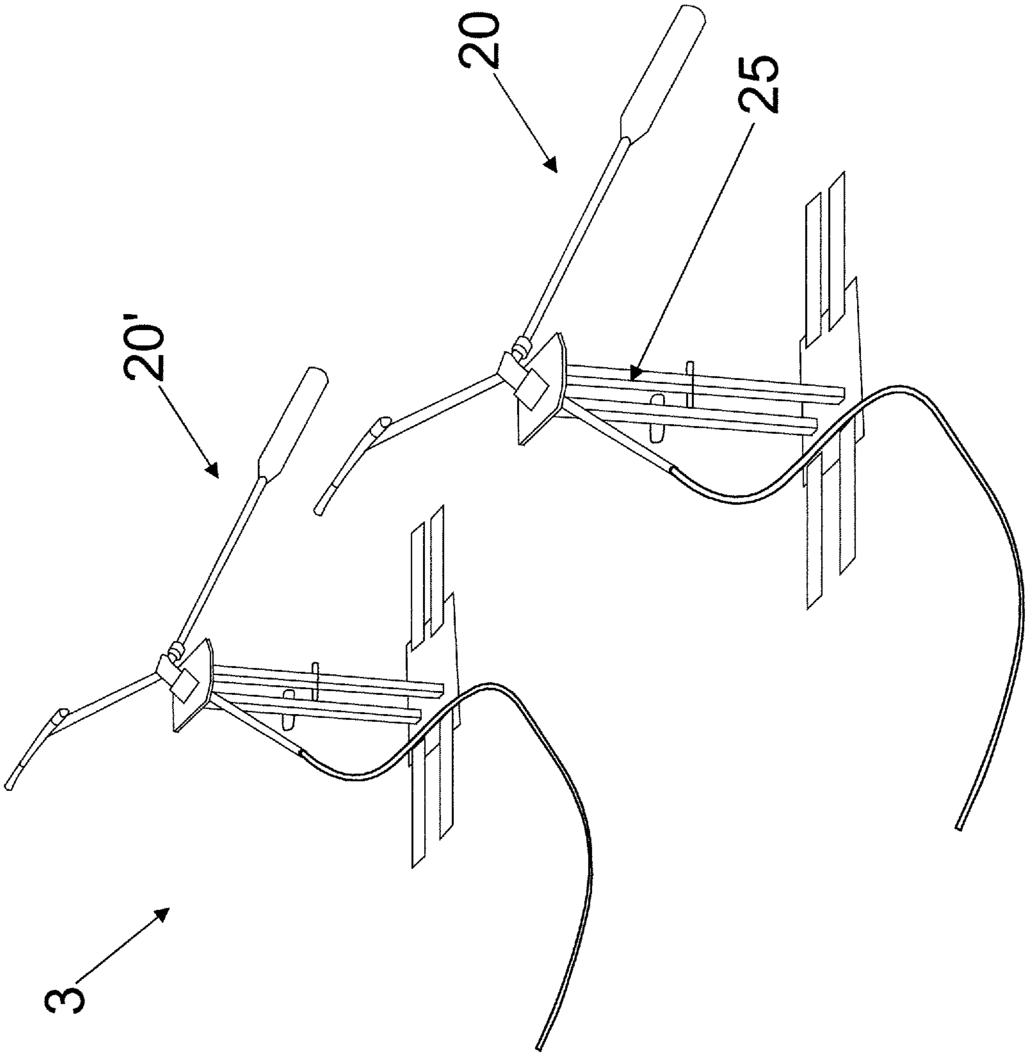
FIG. 4—is a highlighted representation of one of the elements that makes up the system for producing carbon dioxide jets as proposed in the present invention.
Figure 5:
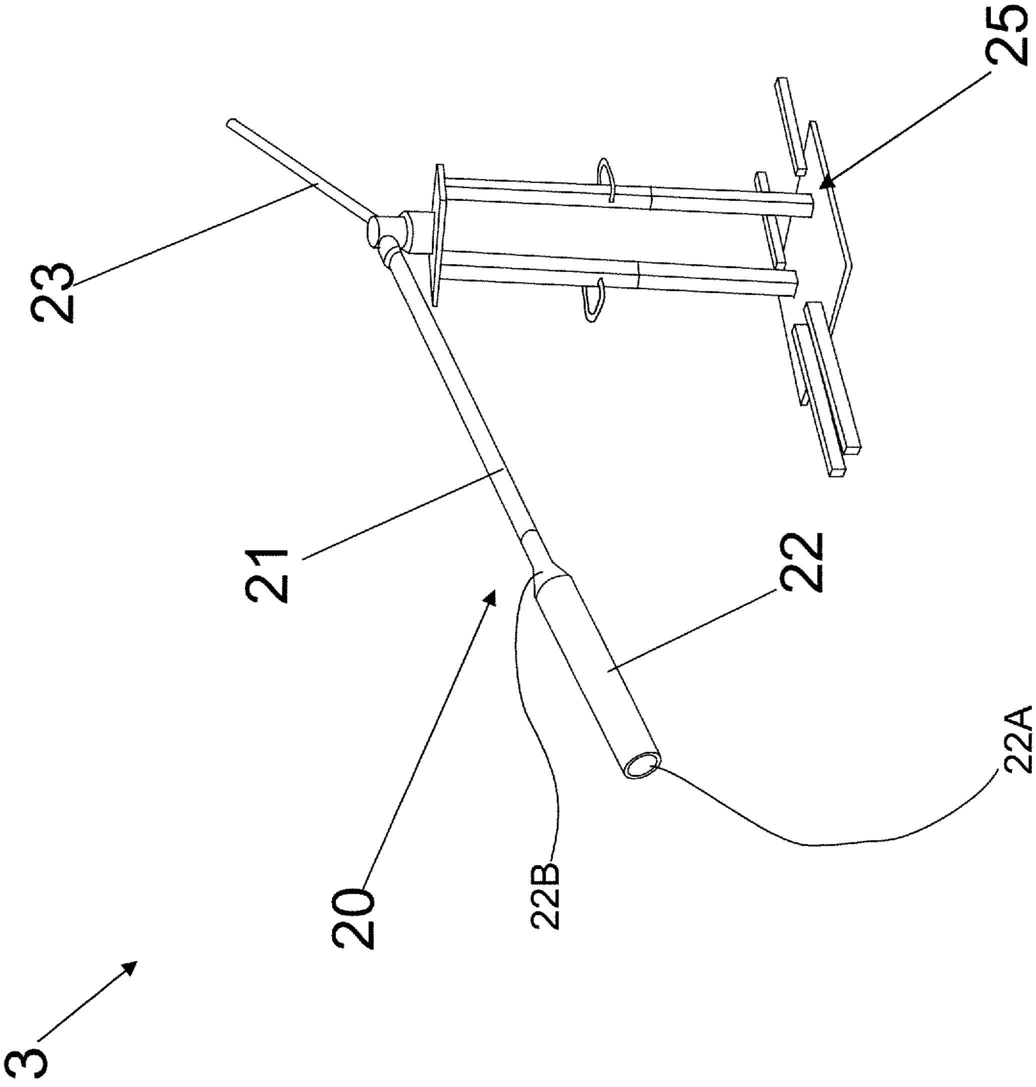
FIG. 5—is an additional highlighted representation of one of the elements that makes up the system for producing carbon dioxide jets as proposed in the present invention.

From FIGS. 1, 4 and 5, it is further observed that each one of the hoses 4 and 4' is associated to the ejector means 20 and 20'. The ejector means 20 consists in a launcher 20 capable of expelling (ejecting) carbon dioxide in the environment, additionally, the referred launcher 20 can be fixed to a support 25 such as illustrated in the figures in question. It is emphasized that the fixation of the launcher 20 to the support 25 refers solely to an exemplifying characteristic of the present invention, so the nonuse of the support 25 is considered as being fully acceptable.

In summary, the launcher 20 is formed by a main body 21 associated to a nozzle 22, such as illustrated in FIGS. 1, 4 and 5. In a non-limitative manner, the main body 21 consists in a double wall tube, assembled with two concentric tubes of different diameters, wherein both the edges of the outer tube are welded to the edges of the inner tube. This configuration forms a vacuum between the tubes with different diameters. Said configuration for the main body 21 guarantees an efficient thermal insulation. Further, it is proposed that the main body 21 of the launcher 20 must be wrapped (covered) with expansive polyurethane foam.

The teachings of the present invention further propose that the launcher 20 comprises at least one handling portion 23 capable of providing an adequate movement to the launcher 20. In a non-limitative manner, the handling portion 23 consists in a stainless-steel tube jacketed with another steel tube and thermal insulating material with high efficiency, to allow the handling even at low temperatures of the $CO_2$ in liquid phase. The quantity of handling portions 23 used does not refer to an essential characteristic of the present invention.

Still in connection with FIGS. 1, 4 and 5, it is observed that the main body 21 of the launcher 20 is associated with a nozzle 22. The function of the nozzle 22, apart from obviously pouring carbon dioxide to contain the fire, consists also in maintaining pressure values in the hoses 4, 4' at acceptable levels (in the range between 250 up to 350 psig) and further allowing that the $CO_2$ in liquid state can run through the hoses 4, 4'.

For the nozzle 22 to maintain the pressure values of the hoses 4 and 4' at the desired levels, it is proposed that the launcher 20 comprises a reducing portion (or constriction portion). More specifically, the referred reducing portion is configured as being a reduction in the diameter of the launcher 20 so that, in one embodiment, the reducing portion occurs at one end of the nozzle 22, such as an end that is adjacent the environment (such as a first end 22A) and which exerts a constriction in the flow of $CO_2$. More specifically, it is proposed that the end 22A of the nozzle has a diameter that is reduced relative to the remainder of the nozzle 22.

The referred reduction in the diameter of the end 22A of the nozzle 22 allows for the pressure and rate in the hoses 4, 4' to be maintained at desired levels, that is, at levels that allow the maintenance of the $CO_2$ in liquid state so that it can subsequently be ejected.

In one embodiment, the constriction can be unique, forming a Venturi effect with the progressive reduction of the diameter of the end 22A as from the diameter of the nozzle 22. Said embodiment would produce a conical longitudinal section at the end 22A of the nozzle 22.

Alternatively, it is proposed that the nozzle 22 be configured as ellipsoid longitudinal section chambers, interconnected by orifices having decreasing diameters up to the end 22A of the nozzle 22 adjacent the environment.

Figure 6:
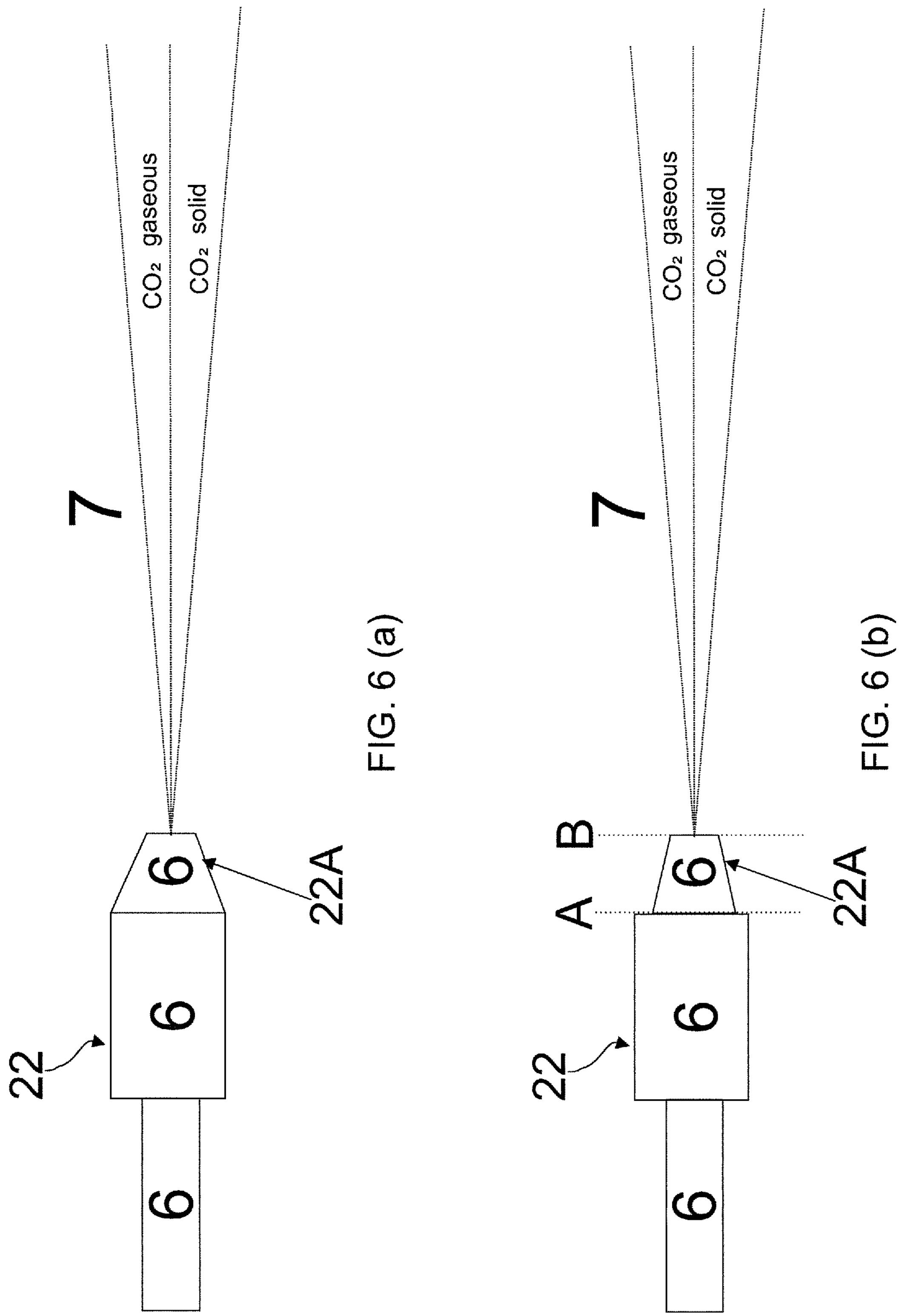
FIG. 6—illustrates a representation of the ejector means which integrates the system proposed in the present invention, wherein FIG. 6(*a*) shows a first variation of the nozzle and the FIG. 6(*b*) shows a second variation of this element.

In one embodiment, and taking FIG. 6(*a*) as reference, the reduction of the diameter of the nozzle 22 can occur gradually, in an equally valid embodiment, the end 22A of the nozzle 22 can have a reduced diameter relative to the remainder of the body of the nozzle 22, thus establishing the referred constriction of the diameter of the nozzle 22 (as a representation of FIG. 6(*b*)).

It is further emphasized that the referred reducing portion can be understood as being an internally positioned element to the nozzle 22, which element, as previously described, must have a reduced diameter relative to the diameter of the nozzle 22.

Figure 10:
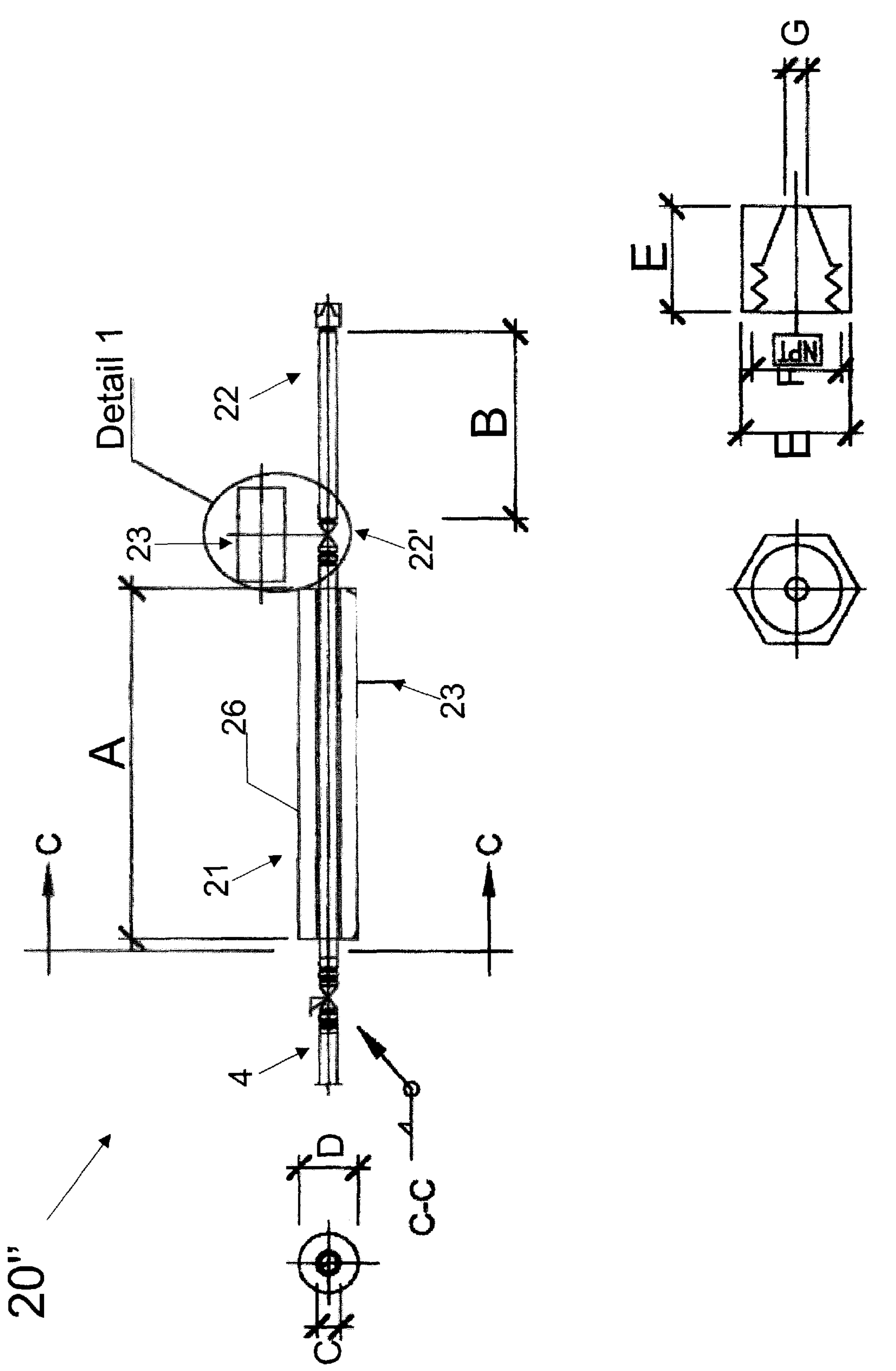
FIG. 10—is an additional representation of one of the elements that can integrate the system for producing carbon dioxide jets as proposed in the present invention.

In equally valid embodiments, the reducing portion does not necessarily need to be present at the end of the nozzle 22 adjacent the environment, so the referred reducing portion could occur at any portion of the launcher 20 (ejector means 20), such as in portion 22' (detail 1) of the launcher 20" exhibited in FIG. 10.

It is thus understood that the point of positioning of the referred constriction (reducing portion) must not be considered as being a limitative characteristic of the present invention.

In this manner it is understood that the referred constriction does not necessarily need to occur at one end of the launcher 20, 20', 20", whereby it may occur at any portion thereof, such as at an intermediary portion or in the initial third or final, so that after the referred constriction, the diameter of the launcher can return to the value that was present before the constriction.

In one embodiment, the referred constriction can be of at least 50% (50% or more) of the value of the diameter existing before the constriction, that is, in a diameter of 2 inches, the constriction can take the diameter to at least one inch or even a lower value.

In equally valid embodiments, the launcher 20, 20', 20" could comprise more than one reducing portion positioned along its length.

FIG. 10 shows a representation of a possible additional configuration for the ejector means 20", which configuration is illustrated in FIG. 10 with numerical reference 20". In summary, the ejector means 20" can be understood as being a manual launcher, so that in said manual launcher it is not necessary to use a base 25, as illustrated in FIGS. 4, 5, 6 and 7.

Therefore, with the manual launcher 20", there is greater freedom of handling on the part of the operator, whereby this person can move aiming at a better strategy for combating the fire.

The manner of operation and working of the manual launcher 20" is similar to that already mentioned for the launcher illustrated in FIGS. 4, 5, 6 and 7, in any case, in the manual launcher 20" it is proposed that the thermal insulation (polyurethane foam) be arranged in the external part of the launcher 20", and more specifically in the external part of the main body 21. In FIG. 10, the thermal insulation is represented with numerical reference 26.

Referring to the highlighted portion exhibited in FIG. 10 (detail 1), it is observed the reducing portion of the launcher 20", that is, the constriction of the diameter of the launcher 20A and which allows the aforementioned retention of the flow of $CO_2$ in gaseous phase so that it is possible to obtain the balance of the pressures in the hoses for subsequent pumping of $CO_2$ in liquid phase. Therefore, and as previously described, with the manual launcher 20" the fluid enters in gas phase until the internal pressure is equal to the storage tank. At this point, the liquid phase can be pumped, generating the High-Speed Jet with Sublimation.

In a solely exemplifying manner, non-limitative values for the dimensioning exhibited in FIG. 10 are illustrated in the table below. Obviously, the values must be considered in a solely exemplifying mode, not representing any limitation to the scope of protection proposed herein, so that any dimensioning which fits into the teachings of the present invention could be used.

| Quota | Dimension (in inches) |
|---|---|
| A | 30" |
| B | 15" |
| C | 2" |
| D | 5" |
| E | 2" |
| F | 1½" |
| G | 0.3" |

It is emphasized that the representations and dimensions of FIG. 10 are not in scale. Moreover, the launcher 20" can use one or several portions of the launcher 23, such as illustrated in the figure under discussion.

Figure 9:
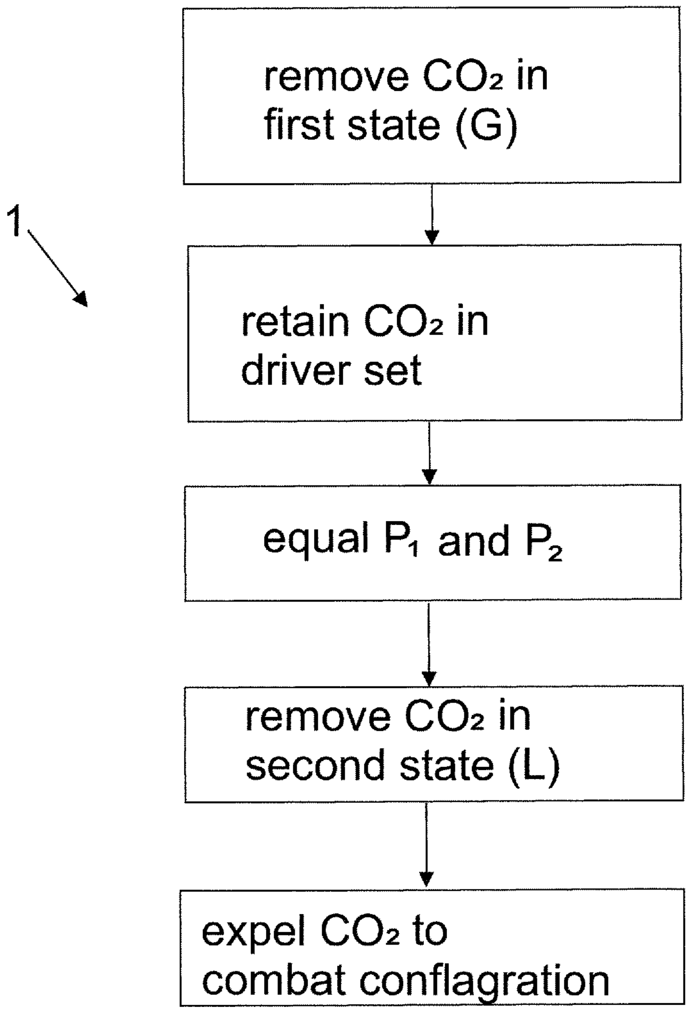
FIG. 9—is a block representation of the method for producing carbon dioxide jets proposed in the present invention.

Having described the main components which integrate the system for producing carbon dioxide jets 10 proposed in the present invention, a preferred embodiment of operation of the referred system will now be addressed describing therefore a method for producing the carbon dioxide jets 1. FIG. 9 illustrates a block representation of the main steps which make up the method 1 in question.

In case of a fire, initially it is necessary to unroll the hoses 4, 4' and extend them, subsequently, the valves of the system must be operated so as to remove $CO_2$ in a first state G from the storage medium 2 and insert it in each one of the hoses 4, 4' of the driver set 3. As previously mentioned, the first state G refers to the $CO_2$ in gaseous phase. It is thus understood that the $CO_2$ in gaseous phase will be inserted not only in the hoses 4, 4' as in the launcher 20, 20', 20" of the driver set 3.

Subsequently, the methodology proposed in the present invention teaches the step of retaining at least one portion of the carbon dioxide in first state G in the driver set 3 (hoses 4, 4' and launcher 20, 20', 20"). The referred step further comprises the additional step wherein a second portion of carbon dioxide in first state G can be expelled through the driver set 3.

It is thus understood that by removing $CO_2$ in gaseous state from the tank 2, a first portion thereof will be maintained in the set of hoses 4, 4' and launcher 20 and a second portion thereof can be expelled through the launcher 20. Therefore, the internal pressure of the hoses and the launcher set is equal to the pressure inside the storage tank.

In summary, it occurs that at the beginning of the production of the High-Speed Jet with Sublimation only $CO_2$ in the first state G pressurizes the hoses with practically 100% of the content, at the same levels as the storage tank 2. For producing the High-Speed Jet with Sublimation of $CO_2$, and, as will be better described ahead, the transfer pump for $CO_2$ in the second state L will be activated to in this manner maintain a fraction between 50% to 70% of $CO_2$ sublimated (solid state) in the jet which will be ejected.

The purpose of the steps described above consists in establishing in each one of the hoses 4, 4' and in the launcher 20, 20', 20" the same pressure conditions as the $CO_2$ in liquid state has inside the tank 2, so that in this manner the remaining steps of the methodology can be carried out.

More specifically, with the insertion of $CO_2$ in gaseous state in the hoses 4, 4' and in the driver set 3, and due to the reducing portion, there will occur an increase in pressure of said elements, thus reaching the same pressure conditions as the $CO_2$ (in liquid state) has inside the tank 2. Thus, the present methodology proposes the step of equaling the pressure value of the driver set $P_2$ (second pressure) to a first pressure value $P_1$, wherein the first pressure value $P_1$ must be understood as being the pressure value of the $CO_2$ in liquid state and which is arranged in the storage tank 2.

Having equaled the values of pressures $P_1$ and $P_2$, in the range defined in the diagram of phases of $CO_2$ as being between 17 and 20 bar, the methodology proposed in the present invention further teaches the step of removing carbon dioxide in a second state L from the storage medium 2 and inserting the carbon dioxide in second state L in the driver set 3, in such a manner that, as already mentioned above, the second state L refers to the $CO_2$ in liquid state.

Figure 7:
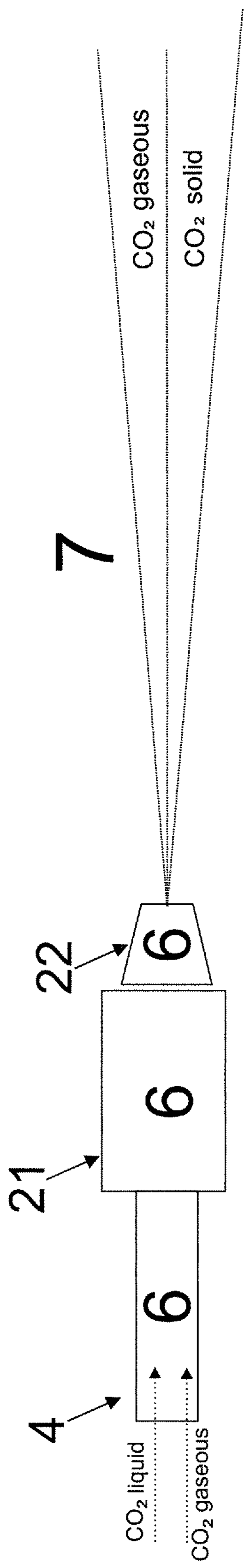
FIG. 7—is a representation of the step of expelling carbon dioxide jets proposed in the present invention, indicating an internal and external portion of the driver set.

After the insertion of the $CO_2$ in second state L in the driver set 3, the methodology proposed in the present invention teaches the step of ejecting the carbon dioxide through the driver set 3. Thus, the carbon dioxide must be ejected (transferred) from an internal portion 5 of the driver set 3 to an external portion 7 of the driver set 3, more specifically, the external portion 7 must be understood as the environment wherein the driver set is arranged, while the internal portion 5 must be understood as being the area positioned internally to the launcher 20 and to the hoses 4, 4'. FIG. 7 illustrates in a solely exemplifying manner the internal portion 6 of the driver set 3 as well as the external portion 7 thereof.

More specifically, the teachings of the present invention propose that in the step of ejecting the carbon dioxide through the driver set 3 there exists carbon dioxide in first state G and in second state L in the internal portion 5 of the driver set, such as illustrated in FIG. 7.

According to the methodology proposed, in the external portion 7 of the driver set 3 there exists carbon dioxide in first state G and in a third state S, so the third state S must be understood as being a solid state, reference being made to FIG. 7. It is therefore understood that upon reaching the external portion 7 of the driver set 3 the carbon dioxide in second state L reaches the third state S.

Figure 8:
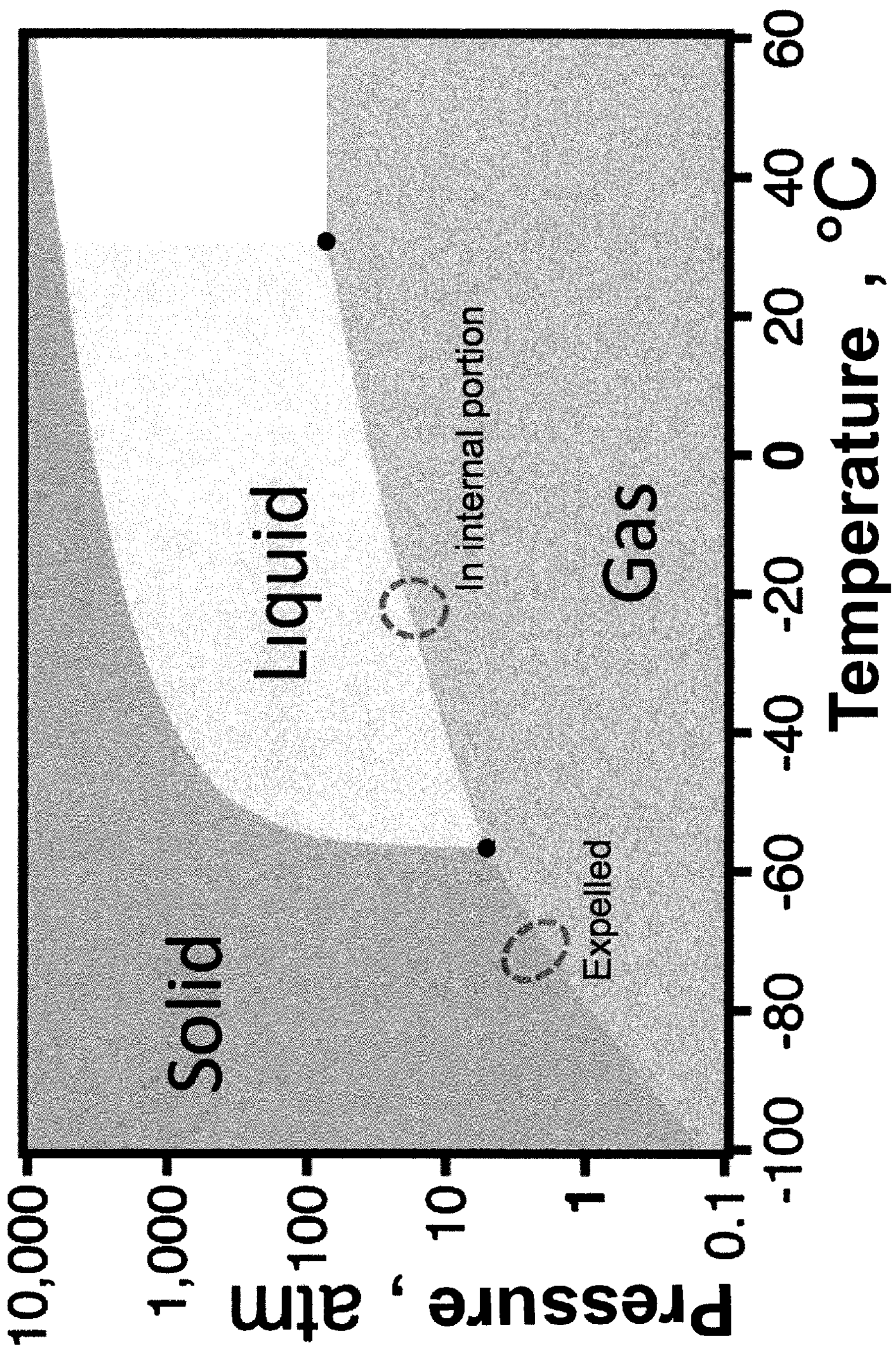
FIG. 8—is a graph of the pressure relative to the temperature, showing the phase changes of the carbon dioxide.

The transformation of the carbon dioxide in second state L to the third state S occurs due to the pressure drop in the instant when the carbon dioxide leaves the internal portion 6 and reaches the external portion 7 of the driver set 3, so that, referring to FIG. 8, it is observed that, due to the referred pressure drop the $CO_2$ passes from a liquid phase to a solid phase.

Thus, the $CO_2$ in second state L is ejected in droplets to contain the fire and will convert into carbonic snowflakes (carbon dioxide in the form of dry ice), instantaneously (due to the pressure drop) and will consequently facilitate the firefighting providing a reduction in the temperature when the dry ice flakes absorb the heat to suffer sublimation once more, returning to the first state G.

More specifically, it is proposed that the $CO_2$ expelled to the external portion 7 must comprise between 30% to 50% of carbon dioxide in first state G and between 50% to 70% of $CO_2$ in its solid state.

Thus, there is proposed a method and system for ejecting carbon dioxide, more specifically a method and system capable of controlling and extinguishing fires, such as fires of the type "A", "B" and "C".

It is further emphasized that after the fire is under control, the reverse methodology must be carried out, that is, initially pump $CO_2$ liquid to the storage medium 2, thus leaving only $CO_2$ in gaseous state in the driver set 3. When there exists only $CO_2$ in gaseous state, it is possible to then interrupt the gas flow in the driver set 3.

As previously mentioned, there are several advantages originating from the teachings of the present invention, such as the fact that the jets of $CO_2$ ejected can unbalance the air inputs of the fire along a line, immediately reducing the burn rate. Further, the carbon dioxide that is expelled can create a door to enter large compartments with a layout of only one access point. Further, the directed carbon dioxide can expel smoke and hot or inflammable gas pockets, allowing the firefighters to enter much more rapidly in the compartments of the conflagrated area.

Additionally, the temperature of the dry ice (carbon dioxide in solid state) at 1 atm is of (−109.3° F.) −78° C. The sublimation of dry ice requires (245.5 BTU/lb) 571.3 kJ/kg, causing cooling of the compartment and, as a natural physical consequence, immediately reducing the volatile emissions of solid combustible materials. To achieve this objective, the dry ice content in the jet flow must be of at least 50%.

Therefore, the continuous injection will result in a progressive reduction of the oxygen concentration inside the compartment and in the extinction of all the fire, even under a pile of debris.

It is further emphasized that the quantity of transport means 4, 4' (hoses) used must not be taken as a limitative characteristic of the present invention, so the use of only one hose is acceptable as well as the use of more than one hose (such as two or more).

Thus, it is also fully possible to use a set of two or more systems for expelling (ejecting) carbon dioxide.

In this sense, the use of a unique system 10 comprised of two or more hoses as well as the joint use of more than one system 10 can allow regulating the air/smoke movement inside a compartment, making up different strategies, such as, for example:

Fluid dynamic curtain: can be made up comprising a matrix of parallel lines surrounding the concentration points of the fire charge, such as piles of goods in a shed, or a set of inflammable transfer bombs in the same containment basin. Operating the matrix in a sweeping motion will move pockets of smoke or inflammable gas away from a critical point or will guide the mass along to an exhaust point.

Binary matrix—this strategy consists in positioning two hoses in parallel lines and opposite directions. This jet will induce a circular movement of the air, smoke, or hot gases, allowing the mass of $CO_2$ to reach the zones behind the objects and/or structure elements that are in the alignment of the jet ejection for extinction, that is, columns, beams, partition walls and others.

Further, the system 10 and the method 1 proposed in the present invention can be advantageous for determined military applications, for example: (a) preventive cooling of munition and storage of explosives, in case of occurrence of any near thermal radiation source, (b) use in internal class "B" fires, particularly in: warship turbine houses; confined fuel storage and fueling operations on deck, in aircraft carriers, (c) creation of cold chambers in the field, for the preservation of human bodies (morgue), in case of a large number of deaths, due to a hostile act or natural disaster and (d) sterilize buildings following a terrorist attack with any type of aerobic pathogen microorganism, such as Anthrax. This can be done using the teachings of the present invention to eliminate all the oxygen inside the compartment, for 24 hours.

Thus, there is described a method and system capable of controlling and extinguishing fires.

In harmony with the teachings previously described, the present invention further approaches an ejector means 20, 20', 20" configured to expel carbon dioxide jets, the ejector means 20, 20', 20" being connectable to a storage medium 2, wherein the storage medium 2 is associated to a first pressure $P_1$ and the ejector means 20, 20', 20" is associated to a second pressure $P_2$, wherein the ejector means 20, 20', 20" is configured to equal the value of the first pressure $P_1$ with the value of the second pressure $P_2$ by means of the reduction of the diameter of the ejector means 20, 20', 20" by means of the aforementioned reducing portion.

In harmony with the previously carried out description, the reduction of the diameter of the ejector means 20, 20', 20" can occur in the nozzle thereof 22, more specifically at a first end 22A of the nozzle 22, said first end 22A being arranged in an adjacent manner to an external portion 7.

Further, it is emphasized that the first pressure $P_1$ represents the value of the carbon dioxide pressure in a second state L arranged in a storage medium 2, while the second pressure $P_2$ represents the pressure of the ejector means 20, 20', 20". Moreover, the nozzle 22 comprises a second end 22B opposite to the first end 22A, wherein the second end 22B is associated to a main body 21 of the ejector means 20, 20', 20".

Additionally, and in harmony with the previously performed description, the present invention further addresses the use of a fluid with biphasic mixture of $CO_2$ in firefighting, wherein the fluid comprises $CO_2$ in a first state and in a third state, so that the fluid further comprises at least 50% of $CO_2$ in solid state.

Moreover, the use of said fluid is compatible with the methodology and systems previously approached, being further compatible with the ejector means described and proposed in the present invention.

Finally, it is emphasized that any reference to value ranges made in the present description must obviously comprise the minimum and maximum limits of the indicated range, as well as any value positioned between said limits. For example, a value range between 5 and 10 mm must comprise the minimum and maximum limits (5 and 10) as well as any value between said limits.

Therefore, the teachings of the present invention are based on the control of the pressure in the transfer system and ejection lines, so that said control is made by the controlled injection of the phases of the $CO_2$ separately, that is, the liquid phase can be injected separately from the gaseous phase. The initial injection of the pure gaseous phase allows pressurizing the transfer system and ejection lines progressively without the occurrence of solidification of $CO_2$ (forming of dry ice) inside the cited elements.

Therefore, at the beginning of the activation of the set, the pressure inside the transfer system and ejection lines will be below what is necessary for the circulation of the liquid phase. The pressure control is made with injection of gaseous phase load in the transfer system and ejection lines. The combination of the pressure of the storage tank 2, with the rate in the transfer system and the constriction of the gaseous fluid flow, which can occur at the end of the ejector means, will provoke a progressive elevation of the pressure inside the transfer system and ejection lines, until this is equalized with the pressure of the storage tank.

At this point, the flow of $CO_2$ in liquid phase, driven by the operation of the pump, can be directed to the transfer system and ejection lines, thus producing a high-speed jet with sublimation at the end of the launcher, without solidification inside the driver system (transfer system+ejection lines+launcher).

Having described an example of a preferred embodiment, it should be understood that the scope of the present invention encompasses other possible variations, being limited only by the content of the accompanying claims, potential equivalents being included therein.

The invention claimed is:

1. A method for producing carbon dioxide jets (1) for controlling and extinguishing fires from an association of a storage medium of carbon dioxide (2) with a driver set (3), wherein the driver set (3) comprises at least one hose (4, 4') associated to an ejector means (20, 20', 20"), said method comprising the steps of:

removing carbon dioxide in a first state (G) from the storage medium (2) and inserting the removed carbon dioxide in the first state (G) in the driver set (3), retaining at least one portion of the carbon dioxide in the first state (G) in the driver set (3), keep inserting the carbon dioxide in the first state (G) in the driver set until a pressure value of the driver set (P2) is equal to a value of a first pressure (P1), wherein the first pressure (P1) is the pressure value of the storage medium of carbon dioxide (2), wherein the pressure value of the driver set (P2) and the first pressure (P1) are equalized in the range between 17 bar and 20 bar, wherein the step of equaling a pressure value of the driver set (P2) to the value of the first pressure (P1) is carried out by means of a reducing portion of the ejector means (20, 20', 20"), wherein the reducing portion is configured as a reduction in the diameter of a portion of the ejector means (20, 20', 20"), having equaled the pressure value of the driver set (P2) with the first pressure (P1), removing the carbon dioxide in a second state (L) from the storage medium (2) and inserting the carbon dioxide in the second state (L) in the driver set (3) to maintain a desired fraction of carbon dioxide in a third state(S) in a jet of carbon dioxide that will be ejected through the driver set (3), and ejecting the jet of carbon dioxide in the first state (G) and in the second state (L) through the driver set (3) to control and extinguish the fire, wherein the jet of carbon dioxide in the first state (G) and in the second state (L) is ejected through the driver set (3) in a speed range between 10 m/s and 100 m/s, wherein the step of ejecting the jet of carbon dioxide in the first state (G) and in the second state (L) through the driver set (3) further comprises the step of transferring the carbon dioxide in the first state (G) and in the second state (L) from an internal portion (6) of the driver set (3) to an external portion (7) of the driver set (3), wherein in the internal portion (6) of the driver set (3) there is carbon dioxide in the first state (G) and in the second state (L), so that at the external portion (7) of the driver set (3) there is carbon dioxide in the first state (G) and in the third state(S), wherein the carbon dioxide ejected to the external portion (7) comprises the desired fraction in the range of 50% to 70% of carbon dioxide in the third state(S) and in the range of 30% to 50% of carbon dioxide in the first state (G), and, wherein the first state (G) is a gaseous state, the second state (L) is a liquid state, and the third state(S) is a solid state.

2. The method according to claim 1, wherein the step of retaining at least one portion of the carbon dioxide in the first state (G) in the driver set (3) further comprises the step of:

expelling a second portion of the carbon dioxide in the first state (G) through the driver set (3).

3. The method according to claim 1, wherein: upon reaching the external portion (7) of the driver set (3), the carbon dioxide in the second state (L) reaches the third state(S), wherein, in the external portion (7), the carbon dioxide in the third state(S) absorbs heat and suffers sublimation, thus reaching the first state (G).

4. The method according to claim 3, wherein the step of ejecting carbon dioxide through the driver set (3) further comprises the step of ejecting carbon dioxide in the first state (G) and in the third state(S) wherein the step of ejecting carbon dioxide in the first state (G) and in the third state(S) comprises:

ejecting carbon dioxide in the third state(S) in at least 50% of the total concentration of carbon dioxide expelled.

5. The method according to claim 1, wherein the storage medium (2) comprises carbon dioxide in the first state (G) and in the second state (L).

6. The method according to claim 1, wherein the ejector means (20, 20', 20") comprises a nozzle (22) associated to a main body (21), wherein the reducing portion is arranged on the nozzle (22) of the ejector means (20, 20', 20"), at one end (22A) of the nozzle (22), wherein the reducing portion is configured as a reduction of at least 50% of the diameter of the ejector means (20, 20', 20").

7. The method according to claim 1, wherein the storage medium of carbon dioxide (2) is coupled to a vaporizer, wherein the method further comprises the step of: removing carbon dioxide in the second state (L) from the storage medium (2) into a vaporizer and returning carbon dioxide in the first state (G) from the vaporizer to the storage medium of carbon dioxide (2).

8. The method according to claim 1, wherein the step of removing carbon dioxide in the second state (L) from the storage medium (2) and inserting the carbon dioxide in the second state (L) in the driver set (3) is done in the range of 190 to 1514 Liters per minute (LPM) (50 to 400 Gallons per minute (GPM)).

* * * * *